(12) United States Patent
Fang

(10) Patent No.: US 8,654,278 B2
(45) Date of Patent: Feb. 18, 2014

(54) BACKLIGHT MODULE AND LIQUID CRYSTAL DISPLAY

(75) Inventor: Kuojun Fang, Shenzhen (CN)

(73) Assignee: Shenzhen China Star Optoelectronics Technology Co., Ltd., Guangdong (TW)

( * ) Notice: Subject to any disclaimer, the term of this patent is extended or adjusted under 35 U.S.C. 154(b) by 43 days.

(21) Appl. No.: 13/519,321

(22) PCT Filed: Apr. 9, 2012

(86) PCT No.: PCT/CN2012/073628
§ 371 (c)(1),
(2), (4) Date: Jun. 26, 2012

(87) PCT Pub. No.: WO2013/143161
PCT Pub. Date: Oct. 3, 2013

(65) Prior Publication Data
US 2013/0258245 A1    Oct. 3, 2013

(30) Foreign Application Priority Data

Mar. 29, 2012  (CN) .......................... 2012 1 0088225

(51) Int. Cl.
*G02F 1/1335* (2006.01)

(52) U.S. Cl.
USPC .................. 349/62; 349/65; 349/66; 349/67; 349/69; 349/70

(58) Field of Classification Search
USPC ........................................................ 349/62–69
See application file for complete search history.

(56) References Cited

U.S. PATENT DOCUMENTS

| | | | |
|---|---|---|---|
| 2010/0002169 A1* | 1/2010 | Kuramitsu et al. | 349/65 |
| 2011/0242458 A1* | 10/2011 | Itakura et al. | 349/65 |
| 2012/0188486 A1* | 7/2012 | Baba et al. | 349/67 |
| 2012/0274871 A1* | 11/2012 | Yamazaki et al. | 349/58 |

* cited by examiner

*Primary Examiner* — Phu Vu

(57) ABSTRACT

The present invention discloses a backlight module and a liquid crystal display (LCD). A backlight module comprising an optical film, at least one light source, at least one reflecting housing and a reflecting surface. The reflecting surface and the optical film are symmetrically disposed with respect to the light source, and are disposed in identical side of the light source; the reflecting housing comprises a first reflecting layer and a second reflecting layer; the reflecting surface has a predetermined trajectory, and corresponds to the first reflecting layer and the light source. In the predetermined trajectory, the lights entering into the reflecting surface are reflected by the reflecting surface and enter into the optical film.

14 Claims, 3 Drawing Sheets

BACKLIGHT MODULE AND LIQUID CRYSTAL DISPLAY

FIELD OF THE INVENTION

The present invention relates to a field of liquid crystal display technology, and more particularly to a backlight module and a liquid crystal display (LCD).

BACKGROUND OF THE INVENTION

With the continuous development of liquid crystal technology, the requirement for the internal components of a liquid crystal display (LCD) is higher and higher.

Referring now to FIG. 1, a structural schematic view of a side-light type of backlight module is illustrated in FIG. 1. In this figure, a light source 11 is disposed at two sides of a light guide plate 12. The lights emitted from the light sources 11 enter into the light guide plate 12, and then uniformly enter into an optical film 13.

Above-mentioned technology that the light guide plate 12 guides the lights of the light source 11 has problems as follows:

Firstly, because the light guide plate 12 has a characteristic of thermal expansion, the light source 11 and a light in surface of the light guide plate 12 can not achieve to seamless connection, so as to limit the improvement of the light coupling efficiency. Besides, the light source 11 has a certain size and the angular aperture of the light source 11 is larger, such as the angular aperture of an light emitting diode (LED) can approach to 90 degree, but the thickness of the light guide plate 12 is fixed, so that it is easy to cause a light leakage from the larger angle of the light source 11.

Secondly, the material of the light guide plate 12 can absorb one part of lights. For example, if the structure of the light guide plate 12 is adopted dot structures, the dot structures will absorb one part of lights, so it will lower the light utilization rate. Besides, the material of the light guide plate 12 has different absorbed rate to different wave frequency, so that with the increasing of the transmission distance in the light guide plate 12, a light out surface 122 of the light guide plate 12 will appear a chromatism phenomenon.

Thirdly, with a development trend of the LCD is toward light-thin and reduction, it is necessary to simplify the LCD structure, but the existence of the light guide plate 12 obstructs the light-thin development of the LCD. Besides, the light guide plate 12 will increase the complexity in design of the backlight module, such as considering of that a warp phenomenon will happen in the light guide plate 12, so that the designing accuracy of components inside the LCD needs to be readjusted. Therefore, the material cost of the light guide plate 12 is expensive, so that the manufacture cost of the LCD will be increased.

As described above, the light coupling efficiency between the light guide plate 12 and the light source 11 is low; the lights absorbed by the light guide plate 12 lower the light utilization rate causing the chromatism phenomenon; and the light guide plate 12 obstructs the light-thin development trend of the LCD, so as to increase the design complexity and cost.

SUMMARY OF THE INVENTION

One of the objects of the present invention is to provide a backlight module, which can solve problems: the light guide plate absorbs lights causing the light utilization rate decreased; the light guide plate increases the design complexity and cost; and low light coupling efficiency between the light guide plate and light source.

To solve above-mentioned problem, the present invention constructs a backlight module, which comprising: an optical film and at least one light source disposed at one side of the optical film;

wherein the backlight module further comprises at least one reflecting housing and a reflecting surface; the reflecting surface and the optical film are symmetrically disposed with respect to the light source, and are disposed in identical side of the light source;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film; and the first reflecting layer has a first arc shape and corresponds to a predetermined trajectory of the reflecting surface, so the lights reflected by the first reflecting layer are reflected into the reflecting surface;

wherein the reflecting surface has the predetermined trajectory; the predetermined trajectory is a Non Uniform Rational B-Spline, and corresponds to the first reflecting layer and the first light source; in the predetermined trajectory, the lights entering into the reflecting surface are reflected by the reflecting surface and enter into the optical film.

In the backlight module of the present invention, wherein the second reflecting layer has a second arc shape and corresponds to the optical film, so the lights reflected by the second reflecting layer are reflected into the optical film.

In the backlight module of the present invention, wherein the light source comprises a first light source and a second light source which are disposed between the optical film and the reflecting surface, and symmetrically disposed with respect to the optical film; the reflecting surface comprises a first reflecting surface and a second reflecting surface; the first reflecting surface corresponds to the first light source, and the second reflecting surface corresponds to the second light source;

wherein the first reflecting surface along a direction far away from the first light source is extended with the predetermined trajectory; and the second reflecting surface along a direction far away from the second light source is extended with the predetermined trajectory; and a joining location of the first reflecting surface and the second reflecting surface forms a bulge forward to the optical film.

In the backlight module of the present invention, wherein the light source comprises a first light source disposed at one side of the optical film; and the reflecting surface along a direction far away from the first light source is extended with the predetermined trajectory.

Another one of the objects of the present invention is to provide a backlight module, which can solve problems: the light guide plate absorbs lights causing the light utilization rate decreased; the light guide plate increases the design complexity and cost; and low light coupling efficiency between the light guide plate and light source.

To solve above-mentioned problem, the present invention constructs a backlight module, which comprising: an optical film and at least one light source disposed at one side of the optical film;

wherein the backlight module further comprises at least one reflecting housing and a reflecting surface; the reflecting surface and the optical film are symmetrically disposed with respect to the light source, and are disposed in identical side of the light source;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film;

wherein the reflecting surface has a predetermined trajectory, and corresponds to the first reflecting layer and the light source; in the predetermined trajectory, the lights entering into the reflecting surface are reflected by the reflecting surface and enter into the optical film.

In the backlight module of the present invention, wherein the first reflecting layer has a first arc shape and corresponds to the predetermined trajectory of the reflecting surface, so the lights reflected by the first reflecting layer are reflected into the reflecting surface; and the second reflecting layer has a second arc shape and corresponds to the optical film, so the lights reflected by the second reflecting layer are reflected into the optical film.

In the backlight module of the present invention, wherein the light source comprises a first light source and a second light source which are disposed between the optical film and the reflecting surface, and symmetrically disposed with respect to the optical film; the reflecting surface comprises a first reflecting surface and a second reflecting surface; the first reflecting surface corresponds to the first light source, and the second reflecting surface corresponds to the second light source; and the first reflecting surface along a direction far away from the first light source is extended with the predetermined trajectory; and the second reflecting surface along a direction far away from the second light source is extended with the predetermined trajectory; and a joining location of the first reflecting surface and the second reflecting surface forms a bulge forward to the optical film.

In the backlight module of the present invention, wherein the light source comprises a first light source disposed at one side of the optical film; and the reflecting surface along a direction far away from the first light source is extended with the predetermined trajectory.

In the backlight module of the present invention, wherein the predetermined trajectory is a Non Uniform Rational B-Spline.

Further, another one of the objects of the present invention is to provide a liquid crystal display (LCD), which comprises a backlight module, wherein the backlight module comprises an optical film and at least one light source disposed at one side of the optical film;

wherein the backlight module further comprises at least one reflecting housing and a reflecting surface; the reflecting surface and the optical film are symmetrically disposed with respect to the light source, and are disposed in identical side of the light source;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film;

wherein the reflecting surface has a predetermined trajectory, and corresponds to the first reflecting layer and the light source; in the predetermined trajectory, the lights entering into the reflecting surface are reflected by the reflecting surface and enter into the optical film.

In the LCD of the present invention, wherein the first reflecting layer has a first arc shape and corresponds to the predetermined trajectory of the reflecting surface, so the lights reflected by the first reflecting layer are reflected into the reflecting surface; and the second reflecting layer has a second arc shape and corresponds to the optical film, so the lights reflected by the second reflecting layer are reflected into the optical film.

In the LCD of the present invention, wherein the light source comprises a first light source and a second light source which are disposed between the optical film and the reflecting surface, and symmetrically disposed with respect to the optical film; the reflecting surface comprises a first reflecting surface and a second reflecting surface; the first reflecting surface corresponds to the first light source, and the second reflecting surface corresponds to the second light source; and the first reflecting surface along a direction far away from the first light source is extended with the predetermined trajectory; and the second reflecting surface along a direction far away from the second light source is extended with the predetermined trajectory; and a joining location of the first reflecting surface and the second reflecting surface forms a bulge forward to the optical film.

In the LCD of the present invention, wherein the light source comprises a first light source disposed at one side of the optical film; and the reflecting surface along a direction far away from the first light source is extended with the predetermined trajectory.

In the LCD of the present invention, wherein the predetermined trajectory is a Non Uniform Rational B-Spline.

In comparison with the traditional technologies, in the present invention, by using a reflecting surface disposed in a backlight module corresponding to an optical film, and a reflecting housing disposed at a location of a light source, one part of the lights emitted from the light source are directly into the reflecting surface and the optical film, and the other part of the lights are into the reflecting surface and the optical film by the reflection of the reflecting housing. Besides, the reflecting surface has a predetermined trajectory, so that the lights emitted into the reflecting surface can completely enter into the optical film. It can ensure a good light coupling efficiency, so as to ensure the image display effect. Moreover, because the light guide plate is unnecessary, it can save the space and cost of the backlight module, and simplify the design of the backlight module.

For above-mention contents of the present invention can be best understood by referring to the following detailed description of the preferred embodiments and the accompanying drawings.

DETAILED DESCRIPTION OF THE PREFERRED EMBODIMENTS

The description of the preferred embodiments refers to the drawings, so as to illustrate the specific embodiments of the present invention which can be carried out.

Figure 1:
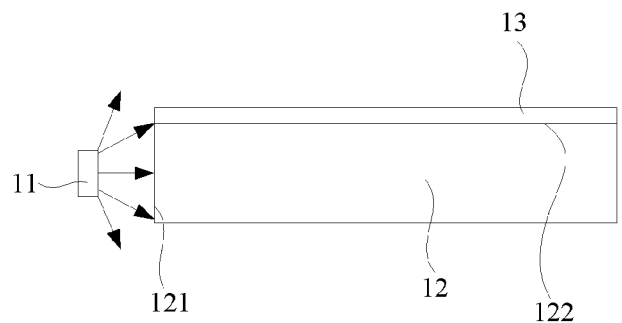
FIG. 1 is a structural schematic view of a backlight module in a traditional technology.
Figure 2:
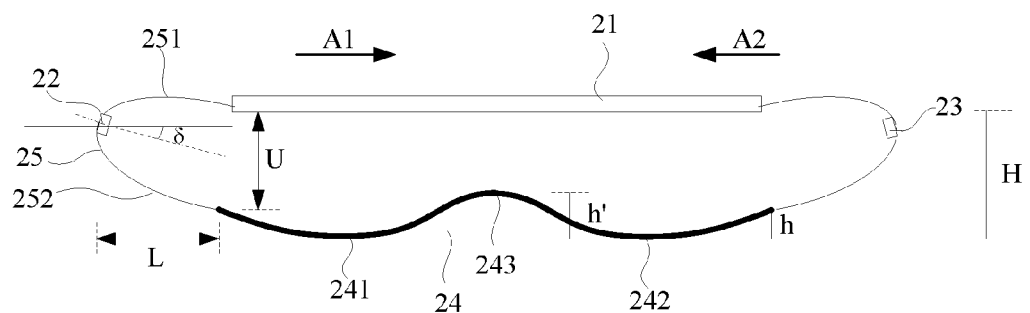
FIG. 2 is a structural schematic view of a backlight module of a first preferred embodiment according to the present invention.

Referring now to FIG. 2, a structural schematic view of a backlight module of a first preferred embodiment according to the present invention is illustrated in FIG. 2.

A backlight module comprises an optical film 21, a first light source 22, a second light source 23, a reflecting surface 24 and two reflecting housings 25, wherein the reflecting surface 24 comprises a first reflecting surface 241 and a second reflecting surface 242. For example with the reflecting housing 25 corresponding to the first light source 22, the reflecting housing 25 comprises a first reflecting layer 251 and a second reflecting layer 252.

The first light source 22 and the second light source 23 are disposed between the optical film 21 and the reflecting surface 24, and are symmetric to each other with respect to the optical film 21. The reflecting surface 24 and the optical film 21 are symmetrically disposed with respect to the first light source 22 and the second light source 23, and are between the first light source 22 and the second light source 23.

As shown the first preferred embedment in FIG. 2, the reflecting surface 24 comprises a first reflecting surface 241 and a second reflecting surface 242 which are symmetric to each other. The first reflecting surface 241 corresponds to the first light source 22, and the second reflecting surface 242 corresponds to the second light source 23.

Continually described with the reflecting housing 25, the first light source 22 is disposed between the first reflecting layer 251 and the second reflecting layer 252, wherein one end of the first reflecting layer 251 is connected with the first light source 22, and the other end of the first reflecting layer 251 is connected with the optical film 21; and one end of the second reflecting layer 252 is connected with the first light source 22, and the other end of the second reflecting layer 252 is connected with the reflecting surface 24.

In this embodiment, the first reflecting layer 251 of the reflecting housing 25 corresponding to the first reflecting surface 241 of the reflecting surface 24 is used for reflecting the lights emitted from the first light source 22 to the first reflecting surface 241; and the second reflecting layer 252 of the reflecting housing 25 corresponding to the optical film 21 is used for reflecting the lights emitted from the first light source 22 to the optical film 21.

In a specific embodiment process, the reflecting surface 24 is to be a predetermined trajectory. For example with the first reflecting surface 241, in the predetermined trajectory, the lights entering into the reflecting surface 24 are reflected by the first reflecting surface 241, and then completely enter into the optical film 21. The predetermined trajectory is preferably to be a Non Uniform Rational B-Spline (NURBS). Certainly, it can be the other trajectories, only the trajectory can completely reflect the lights to the optical film 21, so it is not listed one by one here.

The first reflecting layer 251 has a first arc shape, and the first arc shape corresponds to the predetermined trajectory of the first reflecting surface 241, so that the lights reflected by the first reflecting layer 251 can completely enter into the first reflecting surface 241; and the second reflecting layer 252 has a second arc shape, and the second arc shape corresponds to the optical film 21, so that the lights reflected by the second reflecting layer 252 can completely enter into the optical film 21. In this embedment, the first reflecting layer 251 having the first arc shape and the second reflecting layer 252 having the second arc shape combine as a compound parabola collimator (CPC). The lights emitted from the first light source 22 are reflected by the reflecting housing 25, and then the shape of the lights can be readjusted. The reflected angular aperture is generally smaller than 30°, namely, by using the symmetric axis of the reflecting housing 25 (CPC) as a normal line, the included angle between the reflected lights and the normal line are distributed within a range of ±30°.

Figure 3:
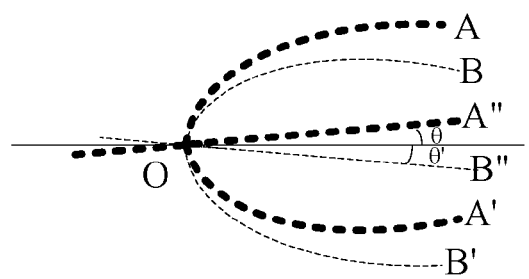
FIG. 3 is a schematic view for forming a parabolic surface of a reflecting housing in FIG. 2.
Figure 4:
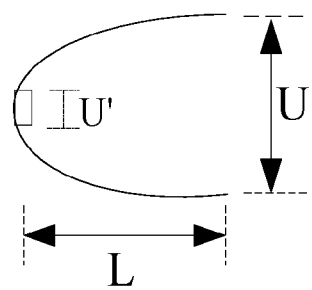
FIG. 4 is a schematic view of the parabolic surface of the reflecting housing in FIG. 2.

Referring to FIGS. 3 and 4, FIG. 3 is a schematic view for explaining how a parabolic surface of the reflecting housing 25 according to the present invention is formed; and FIG. 4 is a schematic view of the parabolic surface of the reflecting housing 25 according to the present invention.

In these figures, the symmetric axes of the parabolic surfaces are both on a horizontal plane, and each of the symmetric axes has a deviation angle to the horizon plane, and then they combine as a compound parabolic surface. Fox example as shown in FIG. 3, the parabolic surface AOA' counterclockwise rotates a θ angle, and the parabolic surface BOB' clockwise rotates a θ' angle, so that the curve BOA' and AOB' combine as the compound parabolic surface.

In a specific embodiment process, it is to select a fit expression equation of the parabolic surface, and to rotate a fit angle, so it makes the focus of the parabolic surface AOA' is close to the parabolic surface BOB', and the focus of the parabolic surface BOB' is close to the parabolic surface AOA', so that the curve BOA' combine as a compound parabolic surface of the reflecting housing 25 as shown in FIG. 4. Besides, in this embodiment, it is to put the light out surfaces of the first light source 22 and the second light source 23 to close the plane which the focuses of the parabolic surface AOA' and the parabolic surface BOB' are, and it can achieve a collimate effect for the reflecting housing 25 (CPC) to the light out surfaces of the first light source 22 and the second light source 23.

In the first preferred embedment as shown in FIG. 2, the first reflecting surface 241 along the direction A1 far away from the first light source 22 is extended with a Non Uniform Rational B-Spline; and the second reflecting surface 242 along the direction A2 far away from the second light source 23 is extended with a Non Uniform Rational B-Spline. A joining location of the first reflecting surface 241 and the second reflecting surface 242 forms a bulge forward to the optical film.

In the embedment as shown in FIG. 2, a slope variation trend of the reflecting surface 24 along the direction A1 is: negative→zero→positive→zero→negative→zero→positive.

Referring to FIGS. 2 and 4 at the same time, the depth of the reflecting housing 25 is L; the clockwise rotating angle of the reflecting housing 25 corresponding to horizontal is δ; the opening diameter of the reflecting housing 25 is U; the middle height of the reflecting surface 24 is h'; the edge height of the reflecting surface 24 is h, certainly, the middle height can be larger than the edge height; and the height of a backlight cavity, namely a space composed between the reflecting surface 24 and the optical film 21, is H. In a specific embodiment process, to control the angular aperture γ of the lights emitted from the first light source 22 is smaller than 30°. If the width of the light out surface of the first light source 22 is U', and the angular aperture of the first light source 22 is γ', the above-mentioned parameters of the reflecting housing 25 can satisfy the equation:

$$\sin \gamma \times U = \sin \gamma' \times U' \times \cos \delta;$$

Figure 5:
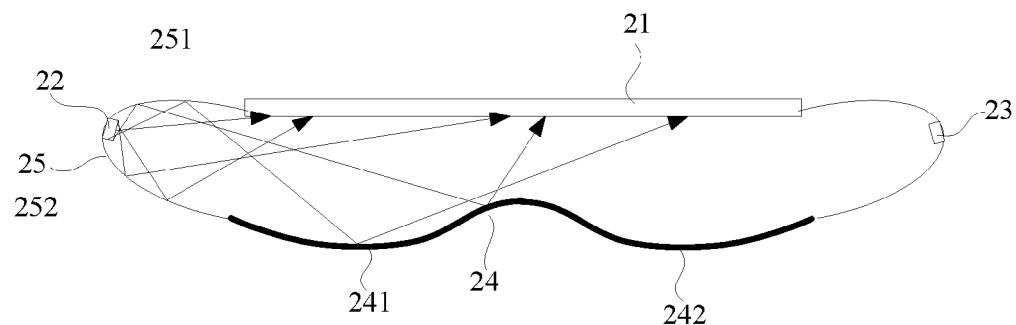
FIG. 5 is a schematic view of a travel directions of lights emitted from a first light source in FIG. 2.

For the first light source 22, $\sin \gamma \times U = U' \times \cos \delta$;

The rotation angle of the reflecting housing 25 can be $0 \leq \delta \leq 30°$, in this embedment it takes $5 \leq \delta \leq 15°$; and $0.2 < U/L < 0.8°$ The working principle of the first preferred embodiment of the backlight module in FIG. 2 to 4 is described as follow:

Referring to FIG. 5 at the same time, FIG. 5 is a schematic view of a travel directions of lights emitted from the first light source 22 in FIG. 2. When the backlight module in a emitting operation, the lights emitted from the first light source 22 are departed into three parts: one part of them directly enter into the reflecting surface 24 and the optical film 21, and they are reflected by the reflecting surface 24 or the optical film 21 repeatedly, so as to be emitted out of the backlight module; another part of them are reflected entering into the first reflecting surface 241 by reflecting of the first reflecting layer 251 of the reflecting housing 25; and the other part of them are reflected entering into the optical film 21 by the reflecting of the second reflecting layer 252 of the reflecting housing 25.

The first reflecting surface 241 has a predetermined trajectory (such as a Non Uniform Rational B-Spline); the first reflecting layer 251 has a first arc shape, and the first arc shape corresponds to the predetermined trajectory, so that the lights reflected by the first reflecting layer 251 can completely enter into the first reflecting surface 241, and completely enter into the optical film 21 by the reflecting of the first reflecting surface 241.

Besides, the second reflecting layer 252 of the reflecting housing 25 has a second arc shape, and the second arc shape corresponds to the optical film 21, so that the lights reflected by the second reflecting layer 252 can completely enter into the optical film 21.

Certainly, the reflecting housing 25 according to the present invention makes the lights which do not directly emit to the reflecting surface 24 and the optical film 21 can be completely reflected to the reflecting surface 24 and the optical film 21, so as to substantially increase the light utilization rate. Moreover, by the cooperation of the reflecting surface 24 and the reflecting housing 25, it can make the lights emitted from the first light source 22 reflected into the optical film 21, so as to save the process guiding the lights to the optical film 21 by a light guide plate. It can not only save material, but also avoid the problem that the light guide plate absorbs lights causing the light utilization rate decreased, so as to simplify the design of the backlight module and lower the cost.

Figure 6:
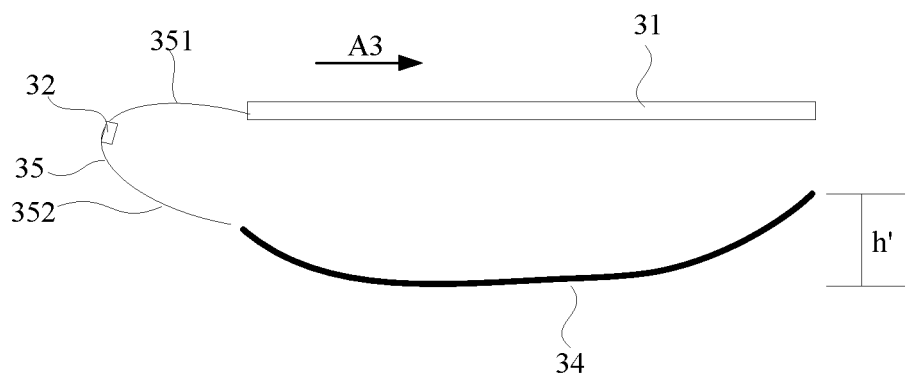
FIG. 6 is a structural schematic view of a backlight module of a second preferred embodiment according to the present invention.

FIG. 6 is a structural schematic view of a backlight module of a second preferred embodiment according to the present invention.

The second preferred embodiment as shown in FIG. 6 comprises an optical film 31, a first light source 32, a reflecting surface 34 and one reflecting housings 35. The difference between the second preferred embodiment in FIG. 6 and the first preferred embodiment in FIG. 2 is that: the second preferred embodiment is a mode of single side light in (only has one first light source 32). The first preferred embodiment is a mode of two sides light in (has the one first light source 22 and the second light source 23)

In this embodiment, the reflecting surface 34 is extended with a predetermined trajectory along the direction A3 far away from the first light source 32, wherein the predetermined trajectory is such as a Non Uniform Rational B-Spline. Certainly, it can be the other trajectories, only the lights emitted into the reflecting surface 34 can completely reflect the lights to the optical film 31, so it is not listed one by one here.

Figure 7:
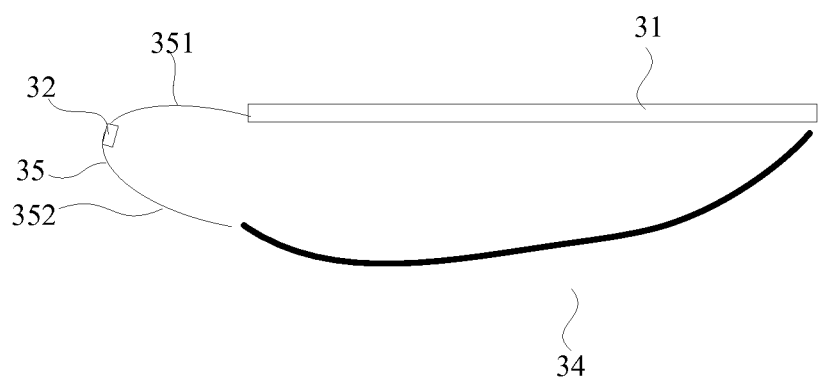
FIG. 7 is a schematic view showing when a middle height of a reflecting surface is equal to a height of a backlight cavity.

FIG. 7 is a schematic view showing when a middle height h' of the reflecting surface 34 is equal to a height H of a backlight cavity (a space composed between the reflecting surface 34 and the optical film 31) in FIG. 6.

The working principle of the second preferred embodiment as show in FIGS. 6 and 7 can refer the working principle of the first preferred embodiment in FIG. 2 to 5, so it does not repeat again.

In the present invention, by using a reflecting surface disposed in a backlight module corresponding to an optical film, and a reflecting housing disposed at a location of a light source, one part of the lights emitted from the light source are directly into the reflecting surface and the optical film, and the other part of the lights are into the reflecting surface and the optical film by the reflection of the reflecting housing. Besides, the reflecting surface has a predetermined trajectory, so that the lights emitted into the reflecting surface can completely enter into the optical film. It can ensure a good light coupling efficiency, so as to ensure the image display effect. Moreover, because the light guide plate is unnecessary, it can save the space and cost of the backlight module, and simplify the design of the backlight module.

As described above, the present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising: an optical film and at least one light source disposed at one side of the optical film; wherein the backlight module further comprises at least one reflecting housing and a reflecting surface; the reflecting surface and the optical film are symmetrically disposed with respect to the light source, and are disposed in identical side of the light source;
wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film; and the first reflecting layer has a first arc shape and corresponds to a predetermined trajectory of the reflecting surface, so the lights reflected by the first reflecting layer are reflected into the reflecting surface;
wherein the reflecting surface has the predetermined trajectory; the predetermined trajectory is a Non Uniform Rational B-Spline, and corresponds to the first reflecting layer and the first light source; in the predetermined trajectory, the lights entering into the reflecting surface are reflected by the reflecting surface and enter into the optical film.

2. The backlight module according to claim 1, wherein the second reflecting layer has a second arc shape and corresponds to the optical film, so the lights reflected by the second reflecting layer are reflected into the optical film.

3. The backlight module according to claim 1, wherein the light source comprises a first light source and a second light source which are disposed between the optical film and the reflecting surface, and symmetrically disposed with respect to the optical film; the reflecting surface comprises a first reflecting surface and a second reflecting surface; the first reflect-surface corresponds to the first light source, and the second reflecting surface corresponds to the second light source;

wherein the first reflecting surface along a direction far away from the first light source is extended with the predetermined trajectory; and the second reflecting surface along a direction far away from the second light source is extended with the predetermined trajectory; and a joining location of the first reflecting surface and the second reflecting surface forms a bulge forward to the optical film.

4. The backlight module according to claim 1, wherein the light source comprises a first light source disposed at one side of the optical film; and the reflecting surface along a direction far away from the first light source is extended with the predetermined trajectory.

5. A backlight module, comprising: an optical film and at least one light source disposed at one side of the optical film;

wherein the backlight module further comprises at least one reflecting housing and a reflecting surface; the reflecting surface and the optical film are symmetrically disposed with respect to the light source, and are disposed in identical side of the light source;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film;

wherein the reflecting surface has a predetermined trajectory, and corresponds to the first reflecting layer and the light source; in the predetermined trajectory, the lights entering into the reflecting surface are reflected by the reflecting surface and enter into the optical film.

6. The backlight module according to claim 5, wherein the first reflecting layer has a first arc shape and corresponds to the predetermined trajectory of the reflecting surface, so the lights reflected by the first reflecting layer are reflected into the reflecting surface; and the second reflecting layer has a second arc shape and corresponds to the optical film, so the lights reflected by the second reflecting layer are reflected into the optical film.

7. The backlight module according to claim 5, wherein the light source comprises a first light source and a second light source which are disposed between the optical film and the reflecting surface, and symmetrically disposed with respect to the optical film; the reflecting surface comprises a first reflecting surface and a second reflecting surface; the first reflecting surface corresponds to the first light source, and the second reflecting surface corresponds to the second light source; and the first reflecting surface along a direction far away from the first light source is extended with the predetermined trajectory; and the second reflecting surface along a direction far away from the second light source is extended with the predetermined trajectory; and a joining location of the first reflecting surface and the second reflecting surface forms a bulge forward to the optical film.

8. The backlight module according to claim 5, wherein the light source comprises a first light source disposed at one side of the optical film; and the reflecting surface along a direction far away from the first light source is extended with the predetermined trajectory.

9. The backlight module according to claim 5, wherein the predetermined trajectory is a Non Uniform Rational B-Spline.

10. A liquid crystal display (LCD), comprising a backlight module, wherein the backlight module comprises an optical film and at least one light source disposed at one side of the optical film;

wherein the backlight module further comprises at least one reflecting housing and a reflecting surface; the reflecting surface and the optical film are symmetrically disposed with respect to the light source, and are disposed in identical side of the light source;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film;

wherein the reflecting surface has a predetermined trajectory, and corresponds to the first reflecting layer and the light source; in the predetermined trajectory, the lights entering into the reflecting surface are reflected by the reflecting surface and enter into the optical film.

11. The LCD according to claim 10, wherein the first reflecting layer has a first arc shape and corresponds to the predetermined trajectory of the reflecting surface, so the lights reflected by the first reflecting layer are reflected into the reflecting surface; and the second reflecting layer has a second arc shape and corresponds to the optical film, so the lights reflected by the second reflecting layer are reflected into the optical film.

12. The LCD according to claim 10, wherein the light source comprises a first light source and a second light source which are disposed between the optical film and the reflecting surface, and symmetrically disposed with respect to the optical film; the reflecting surface comprises a first reflecting surface and a second reflecting surface; the first reflecting surface corresponds to the first light source, and the second reflecting surface corresponds to the second light source; and the first reflecting surface along a direction far away from the first light source is extended with the predetermined trajectory; and the second reflecting surface along a direction far away from the second light source is extended with the predetermined trajectory; and a joining location of the first reflecting surface and the second reflecting surface forms a bulge forward to the optical film.

13. The LCD according to claim 10, wherein the light source comprises a first light source disposed at one side of the optical film; and the reflecting surface along a direction far away from the first light source is extended with the predetermined trajectory.

14. The LCD according to claim 10, wherein the predetermined trajectory is a Non Uniform Rational B-Spline.

* * * * *